M. S. LARSON.
CLUTCH.
APPLICATION FILED OCT. 26, 1916.

1,371,251.

Patented Mar. 15, 1921.
2 SHEETS—SHEET 1.

Inventor:
Martin S. Larson
By Pond & Wilson.
Attys.

M. S. LARSON.
CLUTCH.
APPLICATION FILED OCT. 26, 1916.
1,371,251.
Patented Mar. 15, 1921.
2 SHEETS—SHEET 2.
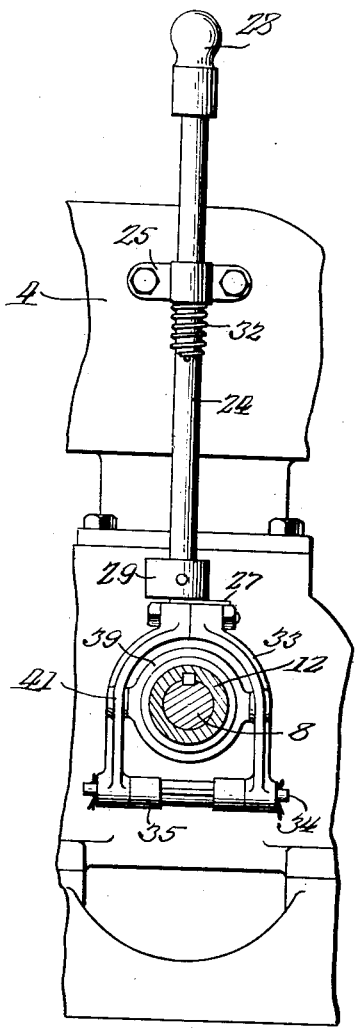
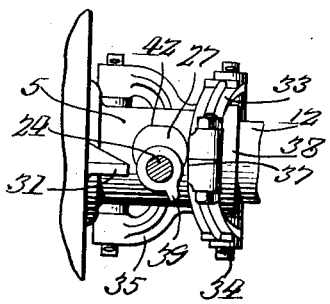
Inventor:
Martin S. Larson
By Pond & Wilson
Attys.

UNITED STATES PATENT OFFICE.

MARTIN S. LARSON, OF ROCKFORD, ILLINOIS, ASSIGNOR TO EMERSON-BRANTINGHAM COMPANY, OF ROCKFORD, ILLINOIS, A CORPORATION OF ILLINOIS.

CLUTCH.

1,371,251.  Specification of Letters Patent.  Patented Mar. 15, 1921.

Application filed October 26, 1916.  Serial No. 127,935.

*To all whom it may concern:*

Be it known that I, MARTIN S. LARSON, a citizen of the United States, residing at Rockford, in the county of Winnebago and State of Illinois, have invented certain new and useful Improvements in Clutches, of which the following is a specification.

This invention relates in general to clutches, and has more particular reference to those especially adapted for use on stationary engines and generally mounted directly on an extending end of the engine shaft and equipped with a belt pulley or sprocket wheel from which power is transmitted. Stationary engines of this character, built in various sizes, are sold in large quantities, especially for farm use and for light manufacturing, and due to the wide range of use to which they are applied and to varying conditions under which they are operated, must be provided with such a clutch and means for operating the same as is most universally suitable for these varying usages and conditions.

The primary object of my invention is to provide an improved clutch and shifting means therefor that shall favorably meet the requirements mentioned above and be so designed and constructed as to be most serviceable and durable and capable of production at a comparatively low cost.

To this end my invention contemplates the provision of a clutch of the cone type, the parts of which are associated on an engine shaft in a novel manner; an improved clutch-shifting device; and improved manually operable means for operating said shifting device whereby the clutch may be very easily and conveniently controlled from varying distances above the engine according to the conditions under which the engine is employed.

Other objects and attendant advantages will be apparent as the invention becomes better understood by reference to the following description when considered in connection with the accompanying drawings in which—

Fig. 2 is a sectional view taken on the line 2—2 of Fig. 1; and

Fig. 3 is a fragmentary sectional view taken on the line 3—3 of Fig. 1.

Figure 1:
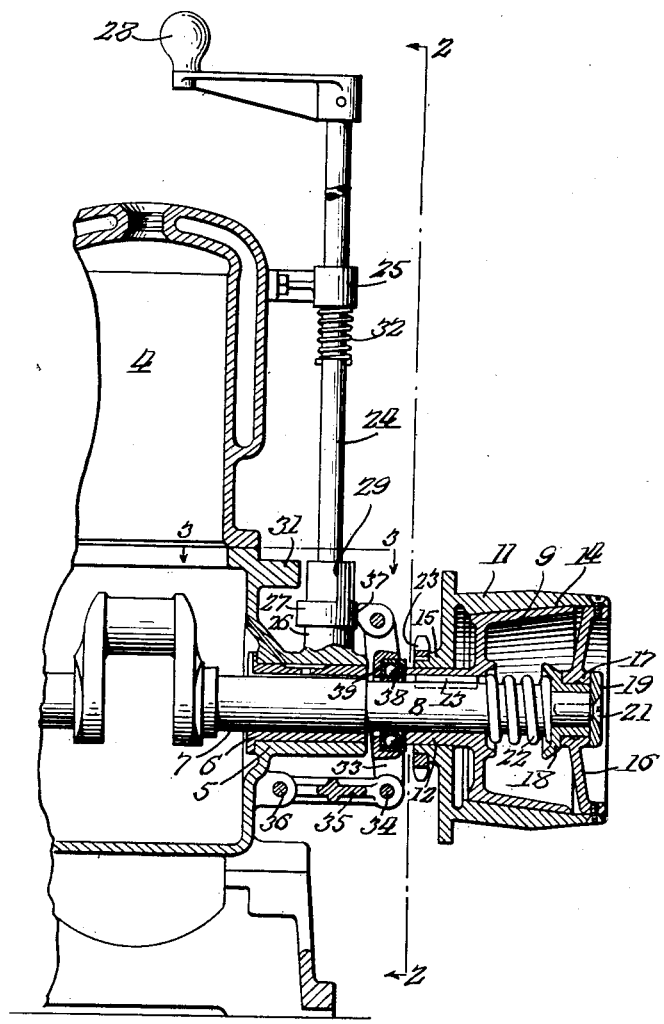
Figure 1 is a vertical longitudinal sectional view through a gas engine and my improved clutch and shifting device.

While my improvements are illustrated in connection with a conventional type of gas engine designated generally by reference character 4, which may be either of the stationary or portable type, it should be understood that they are equally well adapted for use in connection with other machines. In the present instance, the crank case of the engine is shaped to provide a laterally projecting bearing 5 equipped with a bushing 6 in which is journaled one end of a crank shaft 7 having a portion 8 projecting beyond said bearing and on which projecting portion my improved clutch is mounted.

The clutch is of the friction cone type having a driving member and a driven member designated generally by reference characters 9 and 11 respectively. The driving member of the usual truncated cone shape is formed with an integral hub 12 splined on the shaft portion 8 by means of a key 13. The driven member in the present instance in the form of a flanged pulley is provided with an internal cone face 14 and is supported at opposite ends of said face so as to be freely revoluble about the shaft portion 8 and fixed against lengthwise movement with respect thereto. In order to provide a simple, rigid and substantial construction, I have provided the driven member at the inner side of the clutch with an integral web and hub 15 loosely revoluble on the hub 12 of the driving member and have equipped said driven member 11 at its outer side with a detachable radial web or spider 16 having a hub 17 loosely revoluble on a bearing block 18 detachably mounted on the reduced end of the shaft portion 8, the hub 17 being confined at its ends between said bearing block 18 and an end plate 19 suitably secured to the end of the shaft, as by a screw 21. Thus the driven member is substantially mounted in coöperative relation with the driving member 9 which is adapted to be moved longitudinally on the shaft to bring its cone face into and out of engagement with the cone face 14 of the driven member, and by simply removing the plate 19 the entire clutch may be removed from the shaft and disassembled as will be more readily apparent hereinafter. An expansion spring 22 interposed between the block 18 and hub of the driving member on the shaft portion 8 constantly urges the driving member into frictional engagement with the driven member. The driven member 11 while shown in the form of a belt pulley, may be shaped for any other suitable form of drive, such for instance as a sprocket wheel, and in the present instance in order to give the combination of a belt and chain drive, I have equipped said driven member with a sprocket wheel 23 fixedly secured to the hub 15 of said member.

Clutch-equipped gas engines of the character described have been, previous to my invention, generally provided with a clutch-shifting device operable by means of an upright hand lever adapted to be swung back and forth to throw the clutch in and out. By reason of such construction, it is impractical to provide a very long lever enabling the clutch to be shifted from a point considerably above the engine, unless perhaps, auxiliary connections are employed for the purpose. In my present invention I have aimed to provide an improved clutch-shifting device that may be easily operated equally well from a point in close proximity to the engine as from a point considerably above the engine, as is often required by reason of the use to which the engine is put which imposes a condition on the accessibility and manner in which the clutch-shifting device may be operated. I have found a most practical clutch-shifting device for universal purposes to consist of an upright rock shaft mounted on the engine and equipped at its lower end with an eccentric cam for actuating the movable element of the clutch upon imparting an oscillatory movement to the shaft at the upper end thereof, which may be at any practical height above the engine. In the present instance, I have shown an upright rock shaft 24 located intermediate the engine and clutch and journaled intermediate its ends in a bearing bracket 25 secured to the engine and its lower end stepped in a bearing 26 upstanding from and formed integrally with the bearing 5. An eccentric cam 27 fixedly secured to the lower end of the shaft 24 and adapted to be oscillated by rocking the shaft through the agency of any suitable means, as for instance a hand crank 28 secured to the upper end of a shaft 24, is adapted to actuate a yoke connection to disengage the clutch as will be presently apparent. A lateral projection 29 from the part on which the cam is formed is adapted to abut against a fixed stop or abutment 31 rigid with the crank case of the engine to limit oscillation of the shaft 24 in a direction causing the clutch to be disengaged, thus preventing the cam from being moved beyond its high point and allowing the clutch to be disengaged. An expansion spring 32 on the shaft 24 interposed between the bearing bracket 25 and a pin extending through said shaft urges the same downwardly so as to prevent vibration of the shaft and accidental movement of the cam. An operable connection between the cam 27 and movable element 9 of the clutch is established by means of a yoke 33 straddling the crank shaft intermediate the bearing 5 and clutch and pivotally connected at its lower end at 34 to the outer end of a link 35 pivotally mounted at 36 on lugs extending from the crank case, the free end 37 of the yoke 33 being engageable with the cam 27 so that upon oscillation of the said cam the yoke will be swung on its pivot 34 to move the clutch element 9 longitudinally of the crank shaft. One element of a thrust and radial ball bearing 38 on the shaft portion 8 intermediate the bearing 5 and hub 12 of the cone member 9 is secured to a collar 39 pivotally mounted at 41 on the opposed arms of the yoke 33. This bearing serves to support the yoke 33 and link 35 on the crank shaft, and by reason of a thrust engagement with the adjacent end of the collar 12 of the cone member causes the same to be moved longitudinally of the crank shaft upon operation of the yoke by the cam device described.

By reason of the foregoing construction, it will be manifest that with the crank 28 in the position shown, the clutch will be maintained engaged under the influence of the spring 22, and that by turning the crank 28 to rock the shaft 24 in a clockwise direction viewing Fig. 3, the cam 27 will swing the yoke 33 outwardly and through the thrust bearing 38 correspondingly move the cone member 9 outwardly to disengage the same from the member 11, thereby throwing out the clutch. A rocking movement of 90 degrees will be sufficient to throw out the clutch and by providing the cam 27 at its highest point with a flat spot 42 the parts will be maintained in position with the clutch thrown out, since the influence of the spring 22 will be applied through the thrust bearing 38 and yoke 33 to hold the latter firmly against the cam 27. It will be noted, therefore, that the spring 22 in addition to merely engaging the clutch, maintains a connection between the movable element of the clutch and the clutch-shifting yoke and also between the yoke and the cam 27. Also the bearing 38 while serving as a thrust bearing in the connection between the yoke 33 and movable element of the clutch, serves as a radial bearing to support the yoke and link 35 on the shaft. Sufficient play is allowed between the hub 12 of the cone member and the thrust bearing and between the yoke and cam to enable the spring 22 to maintain a proper engagement of the clutch and to take up for the wear. A clutch constructed in the manner described may be very easily assembled and disassembled, since there are no fixed connections between the main relatively movable elements, as they are associated in such manner that each coöperates with the other in maintaining the proper operative relation thereof. By removing the plate 21 the clutch elements 9 and 11, the collar 18 and spring 22 may be withdrawn as an entirety from the engine shaft and these parts disassembled by removing the spider 16 from the member 11. After the clutch has been removed, the yoke 33 may be slipped off, either with or without, the link 35 according to whether the pins 34 or 36 are removed. It will be evident that the rock shaft 24 may be extended above the engine any suitable distance to enable the clutch to be thrown in and out from a particular distance above the engine.

I claim:

1. A clutch comprising a shaft, a sleeve splined on the shaft and having rigidly secured thereto a cone faced member, a pulley or the like journaled on the sleeve and at a point on said shaft at the outer side of the cone shaped member and held at said point against longitudinal movement with respect to the shaft and having an internal cone face with which said cone member is engageable, spring means interposed between the cone member and a part fixed against longitudinal movement with respect to the shaft to constantly urge the cone member into engagement with the opposed cone face, a pivotally mounted yoke straddling the shaft, a thrust and radial bearing on the shaft movable longitudinally thereof with the yoke, said sleeve of the cone member being adapted to have a thrust engagement with said bearing, and means for shifting the yoke to move the cone member against the tension of said spring means to disengage the clutch.

2. A clutch mounted on a shaft, comprising a cone shaped clutch element having a hub splined on the shaft, a clutch element having an internal cone face coöperable with the splined cone element and being revoluble upon the hub thereof, a member mounted on the extreme end portion of the shaft and having an annular peripheral bearing, a spider or web mounted in said peripheral bearing and secured to the outer end of the second mentioned clutch element, means for holding said bearing member and web against longitudinal movement with respect to the shaft whereby the second mentioned clutch element is likewise held against said longitudinal movement, a spring interposed between said bearing member and the splined clutch element constantly urging the latter in a direction to frictionally engage with the second clutch element, and means operable upon the hub of the splined element for moving the same against the pressure of said spring to disengage the clutch.

3. A clutch especially adapted to be mounted on an end portion of a shaft, comprising a cone shaped clutch element provided with a hub splined on the shaft at a distance from said end thereof, a second clutch element having an internal cone face coöperable with the splined element and revoluble upon the hub thereof, means mounted on the extreme end of the shaft providing a bearing for the outer end of the second mentioned clutch element and serving to hold the same against longitudinal movement with respect to the shaft, including a detachable member permitting removal of said clutch element from the shaft, an expansion spring interposed between said means and the splined clutch element and constantly urging the latter in a direction to frictionally engage the second mentioned clutch element, and means operable upon the hub of the splined element to move the same against the pressure of said spring to disengage the clutch.

4. A clutch structure comprising a shaft, a clutch mounted thereon, including a member movable longitudinally of the shaft to engage and disengage the clutch and a spring for constantly urging said member in a direction to engage the clutch, a yoke straddling the shaft and coöperable with said movable clutch member, a link pivotally mounted on a fixed pivot at one side of the shaft and pivotally connected at its free end to the yoke, and a cam engaging the yoke on the side of the shaft diametrically opposite to the pivotal connection of the yoke with said link, the yoke being constantly held by said spring in engagement with the cam, which is operable to move the yoke on its pivot in a direction opposed to the pressure of said spring to disengage the clutch.

5. In a clutch pulley, the combination with a rotating shaft, of a cone member mounted to turn with said shaft and slidable longitudinally thereon, a hollow pulley surrounding said cone member and designed to coöperate with the latter, a pair of bushings mounted on the shaft and loosely receiving said pulley thereon, one of said bushings being slidable longitudinally on the shaft, spring means for normally retaining the cone member in frictional contact with the inner bore of said pulley, and means for sliding the aforesaid bushing on the shaft to correspondingly slide said cone thereon and disconnect the same from the pulley.

6. In a clutch pulley, the combination with a rotating shaft; of a cone member mounted to turn with said shaft and slidable longitudinally thereon, a pulley surrounding said cone member and designed to coöperate with the latter, a pair of bushings carried on said shaft, one of the same being slidable longitudinally thereon, said pulley being journaled on said bushings, spring means for normally retaining the cone member in frictional contact with the inner bore of the pulley, actuating means for manually sliding the last mentioned bushing on the shaft to correspondingly slide the cone member thereon and disconnect the pulley therefrom, and a thrust bearing interposed between the actuating means and the cone member.

7. In a clutch pulley, the combination with a rotating shaft; of a cone member, to turn therewith and slidable longitudinally thereon, a bushing secured stationarily on said shaft, a second bushing slidably mounted on said shaft, a hollow pulley surrounding said cone and loosely journaled at its one end on the slidable bushing, a flange removably secured to the opposite end of said pulley and loosely mounted on the stationary bushing, spring means to normally retain said cone member in frictional contact with the inner bore of the pulley, a thrust bearing interposed between the cone member and the slidable bushing, and means for manually moving said slidable bushing on the shaft.

8. In a clutch, a driving shaft, a driving clutch member rotatable therewith and slidable thereon, a driven clutch member embracing the driving clutch member, a combined bearing and abutment fixed upon the shaft and rotatable therewith, the driven clutch member having a part rotatably mounted upon said bearing, a spring embracing the shaft and rotatable therewith and bearing at opposite ends against the abutment and the driving clutch member to yieldably maintain the clutch members engaged, and means for moving the driving clutch member against the pressure of the spring to disconnect the clutch members.

9. In a clutch, the combination of a driving shaft, a driving cone clutch member rotatable therewith and slidable thereon, a driven clutch member embracing the driving clutch member and having bearings on the shaft at opposite ends of the driving clutch member, a spring engaging the shaft and bearing at opposite ends against one of the bearings and the driving clutch member to yieldably maintain the clutch members engaged, and actuating means associated with the other bearing to move the same and the driving clutch member in opposition to the pressure of the spring to disengage the clutch members.

MARTIN S. LARSON.